US008743570B2

(12) United States Patent
Mueller et al.

(10) Patent No.: US 8,743,570 B2
(45) Date of Patent: Jun. 3, 2014

(54) APPARATUS FOR CONVERTING ELECTRIC ENERGY AND METHOD FOR OPERATING SUCH AN APPARATUS (75) Inventors: Jens-Uwe Mueller, Vellmar (DE); Peter Witsch, Liebenau (DE); Christian Ruehling, Helsa (DE); Andreas Falk, Kassel (DE); Torsten Leifert, Voegelsen (DE)

(73) Assignee: SMA Solar Technology AG, Niestetal (DE)

( * ) Notice: Subject to any disclaimer, the term of this patent is extended or adjusted under 35 U.S.C. 154(b) by 0 days.

(21) Appl. No.: 13/607,671

(22) Filed: Sep. 8, 2012

(65) Prior Publication Data
US 2013/0028000 A1 Jan. 31, 2013

Related U.S. Application Data (63) Continuation of application No. PCT/EP2011/052843, filed on Feb. 25, 2011.

(30) Foreign Application Priority Data

Mar. 8, 2010 (EP) .................................... 10155828

(51) Int. Cl.
H02M 1/12 (2006.01)
(52) U.S. Cl.
USPC ................. 363/40; 363/65; 363/71; 363/120; 363/121
(58) Field of Classification Search
USPC ........... 363/34, 35, 37, 40, 64, 65, 69, 70, 71, 363/120, 121
See application file for complete search history.

(56) References Cited

U.S. PATENT DOCUMENTS

| 5,764,495 | A | 6/1998 | Faulk | |
|---|---|---|---|---|
| 7,583,521 | B2 * | 9/2009 | Nielsen et al. | 363/53 |
| 7,672,149 | B2 | 3/2010 | Falk | |
| 7,880,334 | B2 | 2/2011 | Evans et al. | |
| 8,264,857 | B2 * | 9/2012 | Mallwitz et al. | 363/21.02 |
| 2004/0076028 | A1 * | 4/2004 | Achleitner et al. | 363/65 |

(Continued)

FOREIGN PATENT DOCUMENTS

| DE | 10216252 A1 | 11/2003 |
|---|---|---|
| EP | 1956703 A1 | 8/2008 |
| WO | 2008015461 A1 | 2/2008 |

OTHER PUBLICATIONS

International Preliminary Report on Patentability dated Sep. 25, 2012 in connection with PCT/EP2011/052843.

(Continued)

Primary Examiner — Nguyen Tran
(74) Attorney, Agent, or Firm — Eschweiler & Associates, LLC (57) ABSTRACT A device for converting direct voltage from an electrochemical store or a fuel cell to alternating voltage, includes a two-stage design having a single DC/DC converter stage for generating an intermediate circuit voltage from the output voltage of the electrochemical store or the fuel cell, which converter stage converts, in particular raises, the direct voltage in a wide input voltage range directly to an intermediate circuit voltage with which a DC/AC converter stage can be operated to generate the alternating voltage. The single DC/AC converter stage generates the alternating voltage from the intermediate circuit voltage. The invention further relates to a method for actuating a device for converting direct voltage from a store or energy generator into alternating voltage for feeding into a supply network.

11 Claims, 7 Drawing Sheets

(56) References Cited

U.S. PATENT DOCUMENTS

| | | |
|---|---|---|
| 2005/0157522 A1 | 7/2005 | Osaka |
| 2007/0221267 A1* | 9/2007 | Fornage ................ 136/244 |
| 2008/0067869 A1 | 3/2008 | Evans et al. |
| 2008/0192510 A1 | 8/2008 | Falk |
| 2009/0080222 A1* | 3/2009 | Popescu et al. ............ 363/20 |
| 2010/0013317 A1* | 1/2010 | Ballantine et al. .......... 307/82 |

OTHER PUBLICATIONS

Anderson, et al. "A New Green Power Inverter for Fuel Cells." Annual IEEE Power Electronics Specialists Conference. Jun. 23-27, 2002. 8 Pages.

European Search Report Dated Mar. 7, 2011 for European Application No. EP 10155828.6 filed on Mar. 8, 2010. 13 Pages.

International Search Report Dated Feb. 3, 2012 for International Application No. PCT/EP2011/052843. 14 Pages.

\* cited by examiner

APPARATUS FOR CONVERTING ELECTRIC ENERGY AND METHOD FOR OPERATING SUCH AN APPARATUS

REFERENCE TO RELATED APPLICATIONS

This application is a continuation of International Application number PCT/EP2011/052843 filed on Feb. 25, 2011, which claims priority to European Application number 10155828.6 filed on Mar. 8, 2010.

FIELD

The invention relates to an apparatus for converting electrical energy and a method for operating such an apparatus.

The invention relates in particular to an apparatus for converting electrical energy that is stored in an electrochemical storage device (for example in a rechargeable battery) and is taken from the electrochemical storage device or from a fuel cell or fed thereto. Furthermore, the invention relates to a method for operating such apparatus.

BACKGROUND

In order to convert a DC voltage from a fuel cell or an electrochemical storage device into an AC voltage, in particular for feeding into a power grid, inverters are used, typically with a galvanic isolation being required between the input and the output.

Such inverters need to be designed for operation within a wide input voltage range, in particular in an input voltage range of from 1:2 to 1:3, since the DC voltage generated by a fuel cell, for example, can vary considerably, for example between 25 V and 72 V. In addition, it is possibly also necessary, for example for fuel cells, to supply the fuel cells with energy, for example for starting the operation of the fuel cell, for which purpose a DC voltage of 24 V, for example, needs to be supplied.

For generating an AC voltage of 230 V, for example, according to the prior art a three-stage design of the inverter with, for example, a step-down converter, an RF converter stage connected downstream thereof and the actual DC-to-AC converter, or with an RF converter stage, a step-up converter connected downstream thereof and the actual DC-to-AC converter.

SUMMARY

Considering this background, the invention reduces the complexity required for converting energy in a wide input voltage range of 1:2 to 1:3, for example, with the apparatus being designed to be DC-isolating at the same time.

By the variants of the control method according to the invention, it is possible to reduce the inverter for generating AC voltage from the input voltage to a two-stage design, in particular with a single DC-to-DC converter stage and the actual DC-to-AC converter stage.

In this case, the DC-to-DC converter stage can comprise either a single DC-to-DC converter device or two or more DC-to-DC converter devices connected in parallel, the inputs and outputs of which are conductively connected to each other. Still, by suitable individual driving of the power semiconductors of the single DC-to-DC converter device or the two or more DC-to-DC converter devices connected in parallel, a system voltage of more than 100 V, for example, in particular 230 V, can be generated from a wide input voltage range of 25 V to 72 V, for example. In one embodiment, it is desired in view of optimum efficiency to control the intermediate circuit voltage to the actual peak system voltage.

All or some of the two or more DC-to-DC converter devices connected in parallel can be dimensioned or designed differently and can in both cases be driven either identically or differently. In particular also different driving of identically designed converter devices is provided for, which can be used, for example, to deactivate one of the converters while the other one is running. This "deactivation" takes place, in one embodiment, by virtue of the fact that the switches or valves of the converter are no longer driven, i.e. all are open.

The invention advantageously makes it possible to achieve a situation in which the number of DC-to-DC converter stages of an apparatus connected in series according to the prior art is reduced to a single DC-to-DC converter stage, which leads to a reduction in the hardware complexity, for example for driving the individual DC-to-DC converter stages, and therefore results in lower manufacturing costs. Furthermore, an increase in the efficiency of the apparatus in question is made possible by the invention.

According to one option, the inverter is supplemented by a further DC-to-DC converter stage, however, this further DC-to-DC converter stage is used for generating a DC voltage for supplying the fuel cell, i.e. for example for generating a DC voltage of 24 V. For this purpose, the actual DC-to-AC converter stage is designed for bidirectional operation and possibly, for example, at the start of the operation of the fuel cell, AC voltage is converted into a DC intermediate circuit voltage of 420 V, for example, from the power grid, and then the DC voltage for supplying the fuel cell is generated from this DC intermediate circuit voltage by the further DC-to-DC converter stage. During operation of the fuel cell, however, the DC intermediate circuit voltage is advantageously generated by converting the DC voltage generated by the fuel cell.

Further advantageous embodiments of the invention are described in the dependent claims.

BRIEF DESCRIPTION OF THE DRAWINGS

The invention will be described in more detail below with reference to the attached drawings, in which.

DETAILED DESCRIPTION

Figure 1A:
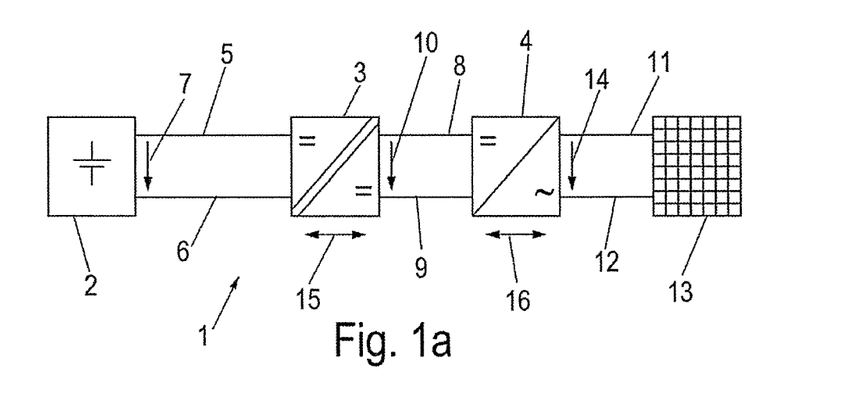
FIG. 1a shows a schematic illustration of a first embodiment of an apparatus according to the invention in the form of a block circuit diagram.

FIG. 1a shows a first embodiment of an apparatus 1 according to the invention with an electrochemical energy generator, which generates electrical energy by means of conversion from another form of energy, or an electrochemical storage device 2 (for example a rechargeable battery or a fuel cell), a DC-to-DC converter stage 3 and a DC-to-AC converter stage 4.

The output terminals of the energy generator or storage device 2 are connected via electrical lines 5 and 6 to the terminals of the battery side of the, in one embodiment, bidirectionally operable DC-to-DC converter stage 3. The output voltage of the energy generator or storage device 2 is applied between the lines 5 and 6. Said output voltage is denoted by a voltage arrow 7. The intermediate circuit terminals of the DC-to-DC converter stage 3 are connected via electrical lines 8 and 9 to the terminals of the DC voltage side of the, in one embodiment, bidirectionally operable DC-to-AC converter stage 4.

The region between the DC-to-DC converter stage 3 and the DC-to-AC converter stage 4 is also referred to as intermediate circuit, and correspondingly the voltage denoted by the voltage arrow 10 is also referred to as intermediate circuit voltage.

The terminals on the AC side of the DC-to-AC converter stage 4 are connected via electrical lines 11 and 12 to an electrical power grid 13 (for example a 230 V, 50 Hz voltage supply system), and a system voltage, symbolized by the voltage arrow 14, is correspondingly applied between the lines 11 and 12. A desirable, but not compulsory, bidirectional operation of the DC-to-DC converter stage 3 and the DC-to-AC converter stage 4 is illustrated by the directional arrows 15 and 16.

If electrical energy stored in the storage device or energy generator 2 or generated thereby is to be fed into the grid 13, the battery voltage 7 is converted to the intermediate circuit voltage level 10 by means of the DC-to-DC converter stage 3. Then, the intermediate circuit voltage 10 is converted by the DC-to-AC converter stage 4 to the system voltage level 14 and fed to the grid 13.

If, on the other hand, electrical energy is to be drawn from the grid 13 and stored in the storage device 2, the system voltage 14 is at first converted by means of the DC-to-AC converter stage 4 to the intermediate circuit voltage level 10 and then converted by means of the DC-to-DC converter stage 3 to the battery voltage level 7. This description of the mode of operation is very simplified, however, the boundary conditions that need to be taken into consideration are known to a person skilled in the art.

In order to supplement the statements in the present application, reference is made to EP 1 956 703 A1 by the applicant, the disclosure content of which is hereby fully incorporated by reference in the present application.

Figures 2A, 2B:
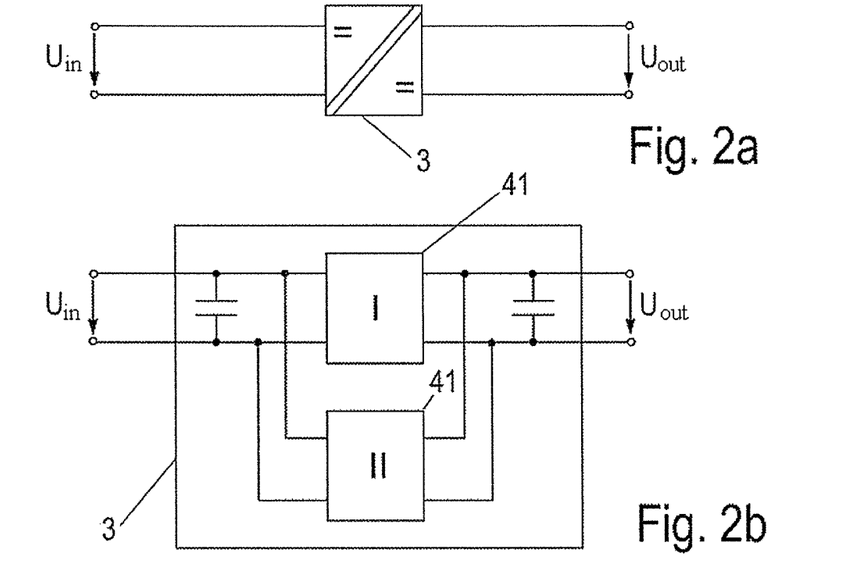
FIG. 2a shows a schematic illustration of a DC-to-DC converter stage in the form of a block circuit diagram.
FIG. 2b shows a schematic illustration of a DC-to-DC converter stage in the form of a block circuit diagram, the converter stage having two DC-to-DC converter devices.
Figure 2C:
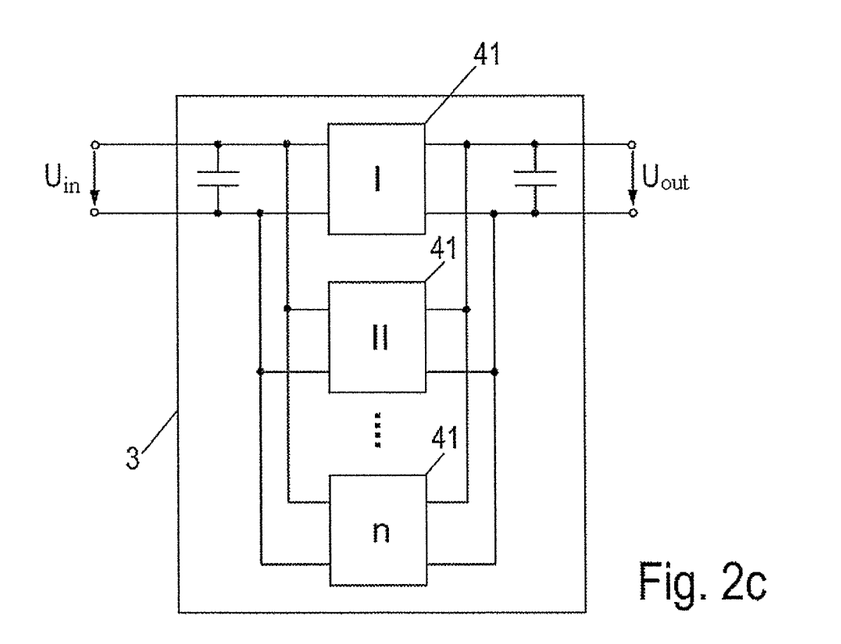
FIG. 2c shows a schematic illustration of a DC-to-DC converter stage in the form of a block circuit diagram, the converter stage having n DC-to-DC converter devices.

According to the invention, the DC-to-DC converter stage 3 has at least one DC-to-DC converter device or a plurality of DC-to-DC converter devices connected in parallel. The DC-to-DC converter stage 3 illustrated in FIG. 2a can therefore comprise two DC-to-DC converter devices, as illustrated in FIG. 2b, or "n" DC-to-DC converter devices, as illustrated in FIG. 2c.

Figure 3A:
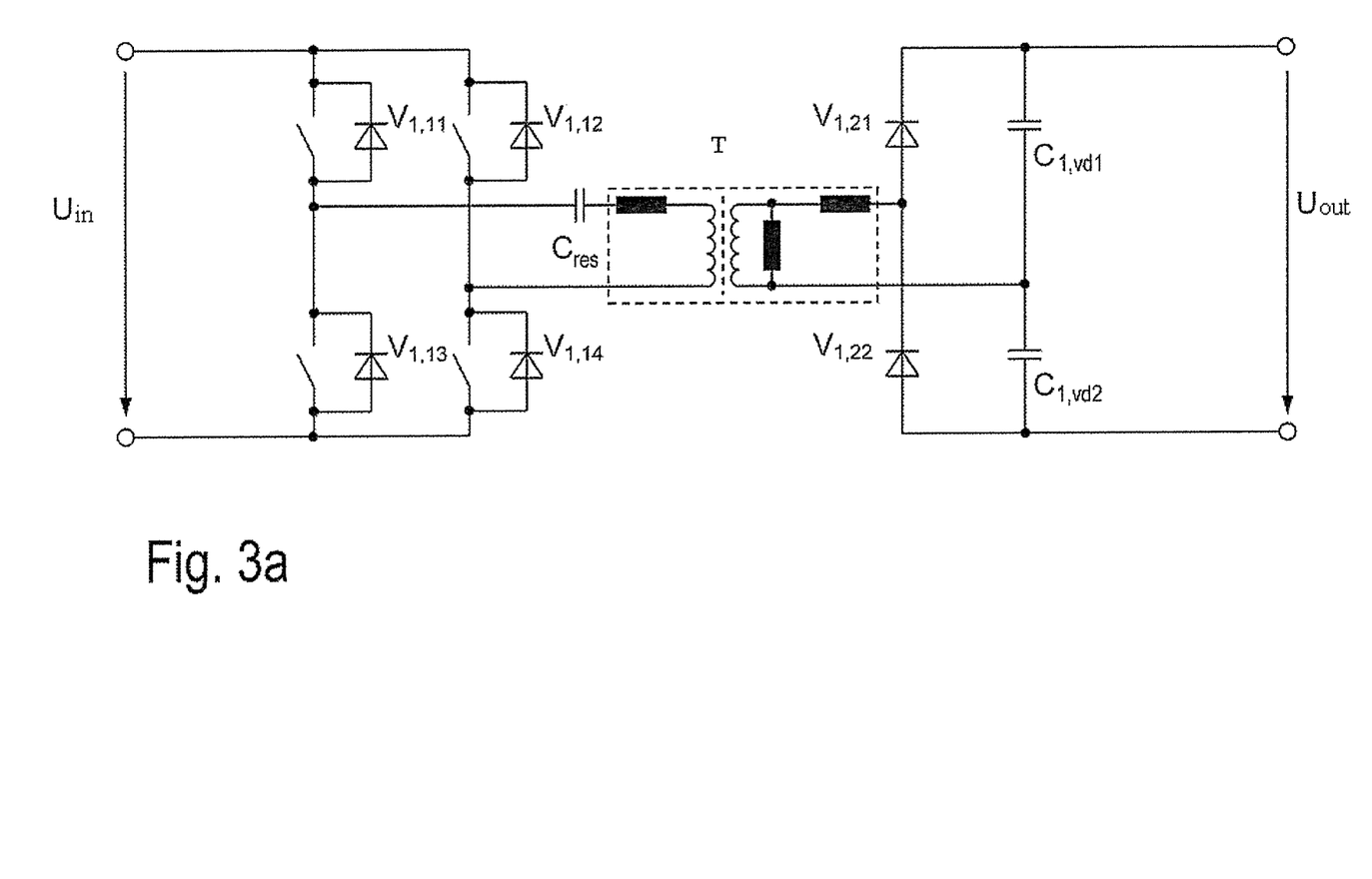
FIG. 3a shows an example electronic circuit of a unidirectional DC-to-DC converter device.
Figure 3B:
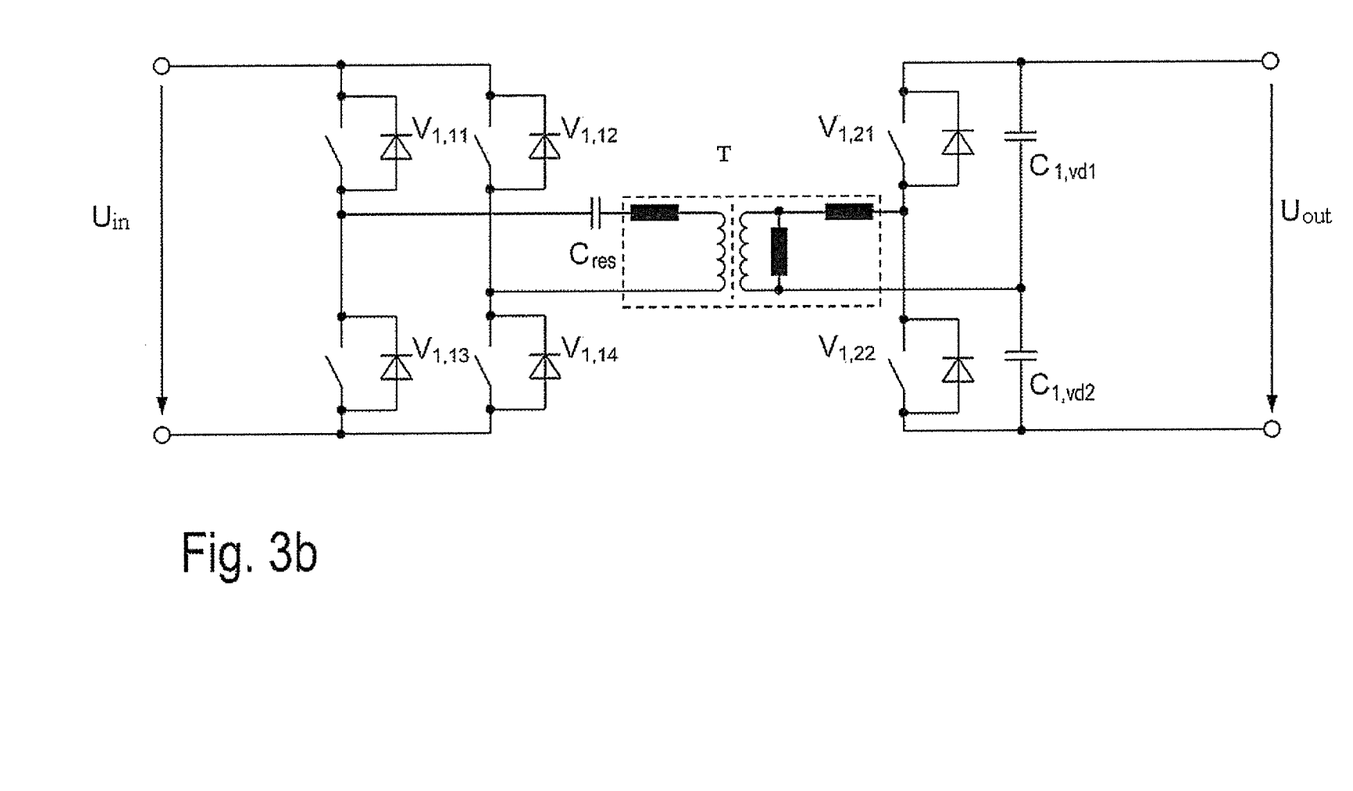
FIG. 3b shows an example electronic circuit of a bidirectional DC-to-DC converter device.
Figure 3C:
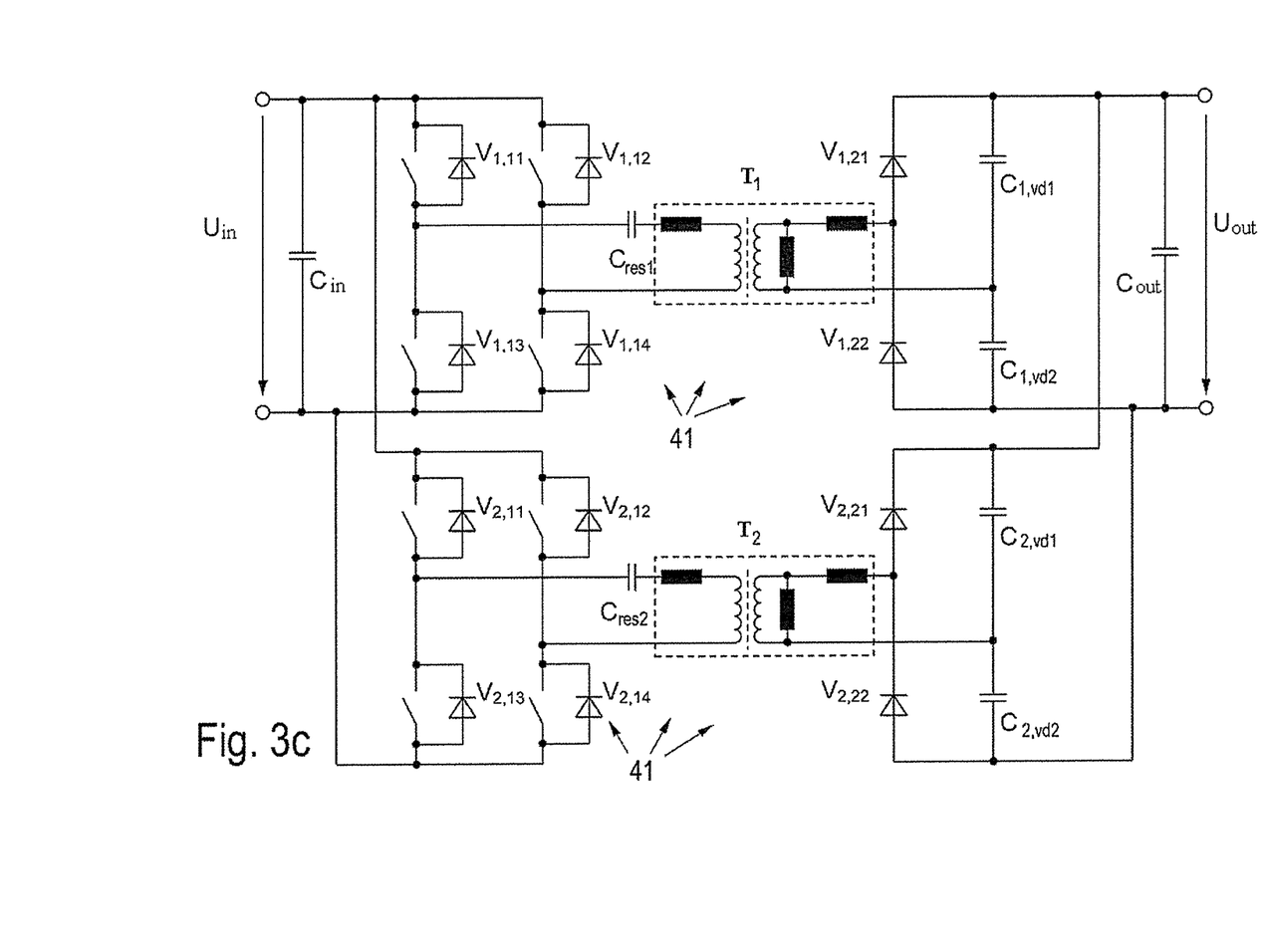
FIG. 3c shows an example electronic circuit of a parallel connection of two DC-to-DC converter devices of the type illustrated by way of example in FIG. 3a, FIGS. 4a-4d show example control characteristics for two differently dimensioned DC-to-DC converter devices.

An example circuit of a DC-to-DC converter device with a unidirectional design is illustrated in FIG. 3a, and an exemplary circuit of a DC-to-DC converter device with a bidirectional design is illustrated in FIG. 3b. In addition, FIG. 3c shows an exemplary electronic circuit comprising two DC-to-DC converter devices connected in parallel.

The electronic circuits shown in FIGS. 3a and 3b, as well as 3c, serve merely as an example of DC-to-DC converter devices that can be used in the context of the present invention. The components of the example circuits have therefore not been provided with reference symbols, for reasons of clarity, but merely with the generally known designations for a respective component part (V for valves or power semiconductors, C for capacitors, T for transformers etc.). The DC-to-DC converter devices are DC-isolating and have correspondingly an RF transformer and can be operated in a hard-switching and in a resonant-switching operating mode, in particular also zero current switching (ZCS) and zero voltage switching (ZVS) and variants of these operating modes. The design and the principle mode of operation of the circuits shown and the previously mentioned operating modes are known to a person skilled in the art and do not require any further explanation at this point.

By virtue of the use of such circuits, the step-up converters/step-down converters required in the prior art can advantageously be dispensed with, if the circuits are driven in a corresponding manner. The number of converter stages is thus reduced, which results in a reduction in the manufacturing costs and usually in an improvement of the efficiency.

The DC-to-DC converter stage 3 can have a plurality of (two or more) DC-to-DC converter devices 41 that do not differ from each other in terms of a number of characteristic values characterizing a DC-to-DC converter device, in other words, the DC-to-DC converter stage 3 can have a plurality of DC-to-DC converter devices 41 that are dimensioned or designed substantially identically.

Furthermore, the DC-to-DC converter stage 3 can have a plurality of DC-to-DC converter devices 41 that differ from each other in terms of a number of characteristic values characterizing a DC-to-DC converter device, in other words, the DC-to-DC converter stage 3 can have a plurality of DC-to-DC converter devices 41 that are dimensioned or designed differently.

A DC-to-DC converter device is characterized, for example, by one or more of the following characteristic values: an input voltage range, an output voltage range, a rated power, a minimum or a maximum clock frequency and/or a minimum or maximum duty cycle.

The DC-to-DC converter device can be operated in different operating modes.

The operating mode of a DC-to-DC converter device can be configured by control parameters. These can be stored, for example, in a control device (not illustrated), with the control device driving one or more DC-to-DC converter devices corresponding to a number of control parameters.

The control parameters can relate to: a clock frequency and a duty cycle of the square-wave pulse sequences for opening and closing the switches or valves of a DC-to-DC converter device. Furthermore, the control parameters can be variable depending on an input voltage and/or an electrical power to be transmitted.

As already mentioned, a converter stage 3 can have two differently designed or dimensioned DC-to-DC converter devices 41. Examples of driving two differently designed or dimensioned DC-to-DC converter devices of a converter stage 3 is illustrated by way of example as a function of the input voltage $U_{in}$ of the converter stage 3 in FIGS. 4a to 4d.

Figure 4A:
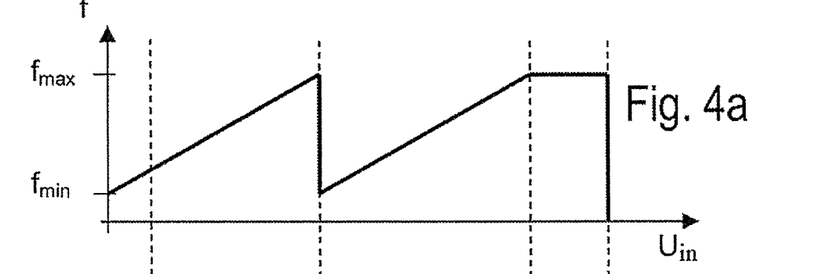
Figure 4B:
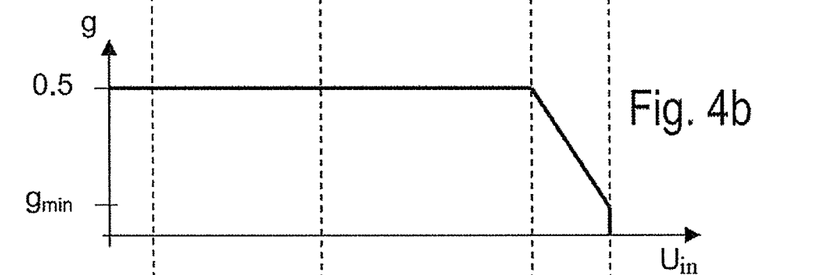
Figure 4C:
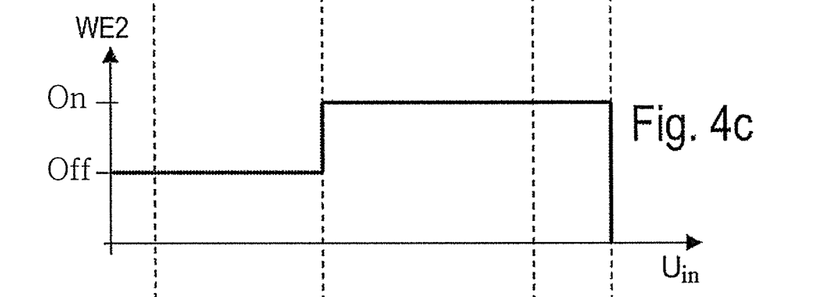
Figure 4D:
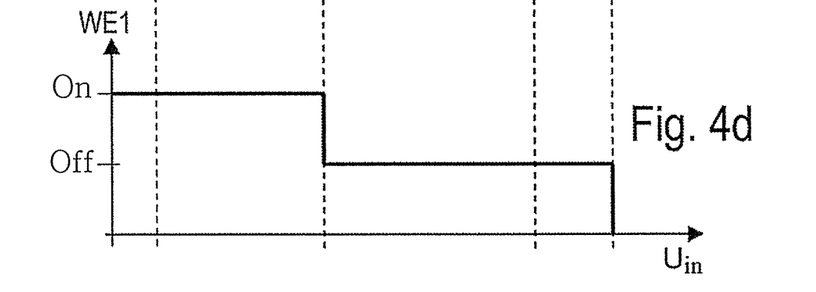

Overall, it is clear from FIGS. 4a to 4d that, as the input voltage $U_{in}$ increases, at first the first DC-to-DC converter device WE1 is in operation (FIG. 4d).

The clock frequency f of the first DC-to-DC converter device is increased as the input voltage $U_{in}$ increases, in this case up to the point of the maximum clock frequency $f_{max}$ (FIG. 4a). Then, as the input voltage $U_{in}$ increases further, the first DC-to-DC converter device WE1 is deactivated (FIG. 4d) and the second DC-to-DC converter device WE2 is activated (FIG. 4c). As the input voltage $U_{in}$ of the converter stage increases further, the clock frequency f of the second DC-to-DC converter device is increased further, in this case up to the maximum clock frequency $f_{max}$ (FIG. 4a). If the input voltage increases further, the clock frequency remains constant in this illustrated example (FIG. 4a) and the duty cycle g of the second DC-to-DC converter device is reduced from 0.5 to the minimum duty cycle $g_{min}$ as the input voltage $U_{in}$ increases further. Alternatively, in some circumstances it may also be expedient to also reduce the clock frequency as the control factor or duty cycle g decreases.

The first DC-to-DC converter device covers the lower range of the input voltage $U_{in}$ in the example illustrated, while the second DC-to-DC converter device covers the upper range of the input voltage $U_{in}$.

In this way, the large input voltage range of a converter stage 3 according to the invention is achieved, with this converter stage 3 having two differently configured or dimensioned DC-to-DC converter devices.

As has likewise already been mentioned, a converter stage 3 can have two identically configured or dimensioned DC-to-DC converter devices 41. An example driving of two identically designed or dimensioned DC-to-DC converter devices of a converter stage 3 is illustrated as a function of the input voltage $U_{in}$ of the converter stage 3 by way of example in FIGS. 5a to 5d.

Figure 5A:
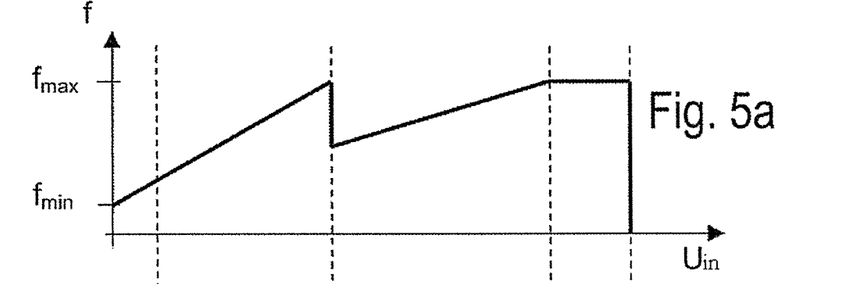
FIGS. 5a-5d show example control characteristics for two identically dimensioned DC-to-DC converter devices.
Figure 5B:
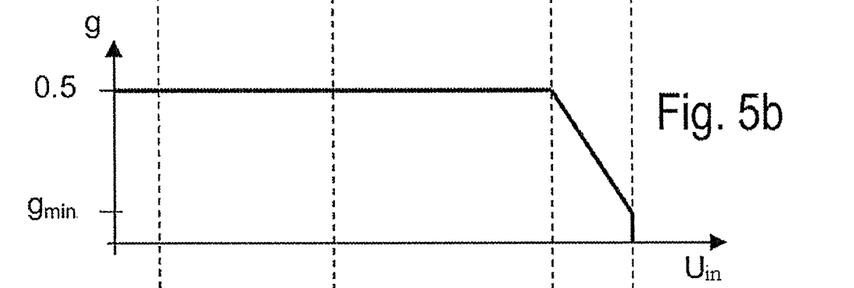
Figure 5C:
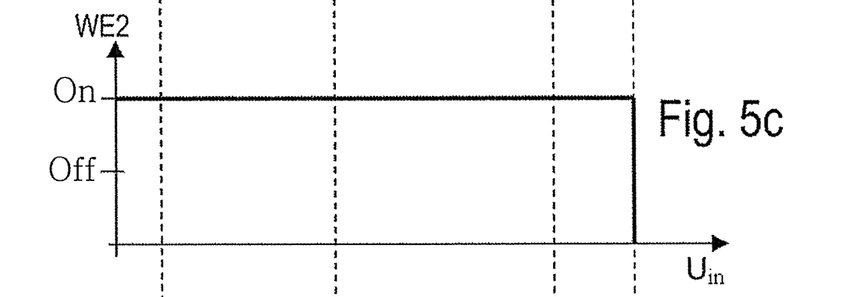
Figure 5D:
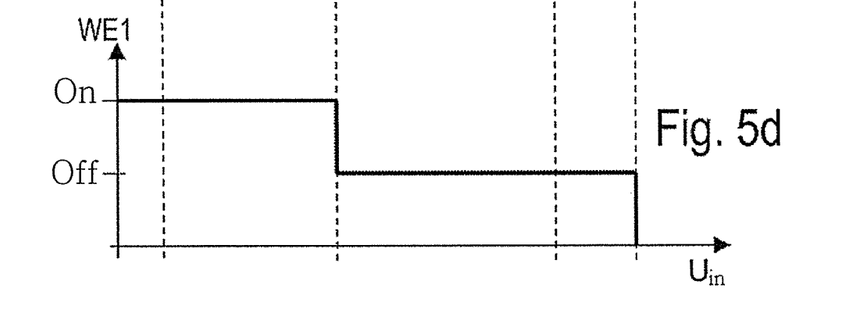

It can be seen from FIGS. 5a to 5d that, in a low input voltage range, both DC-to-DC converter devices WE1 and WE2 are active (FIGS. 5c and 5d) and as the input voltage $U_{in}$ increases, are driven at an increasing clock frequency f (FIG. 5a). If a specific clock frequency, in this case the maximum clock frequency $f_{max}$, is reached, the first DC-to-DC converter device WE1 is deactivated (FIG. 5d) and, in one embodiment, the clock frequency f is set back to a lower value on deactivation. The second DC-to-DC converter device WE2 remains in operation (FIG. 5c) and is in turn driven by a clock frequency f that increases as the input voltage $U_{in}$ increases, in this case until the maximum clock frequency $f_{max}$ is reached (FIG. 5a). As the maximum clock frequency $f_{max}$ is reached, the duty cycle g of 0.5 is reduced to the minimum duty cycle $g_{min}$ as the input voltage $U_{in}$ increases further (FIG. 5b).

In this way, the large input voltage range of a converter stage 3 according to the invention is achieved, with this converter stage 3 having two identically designed or dimensioned DC-to-DC converter devices.

Figure 1B:
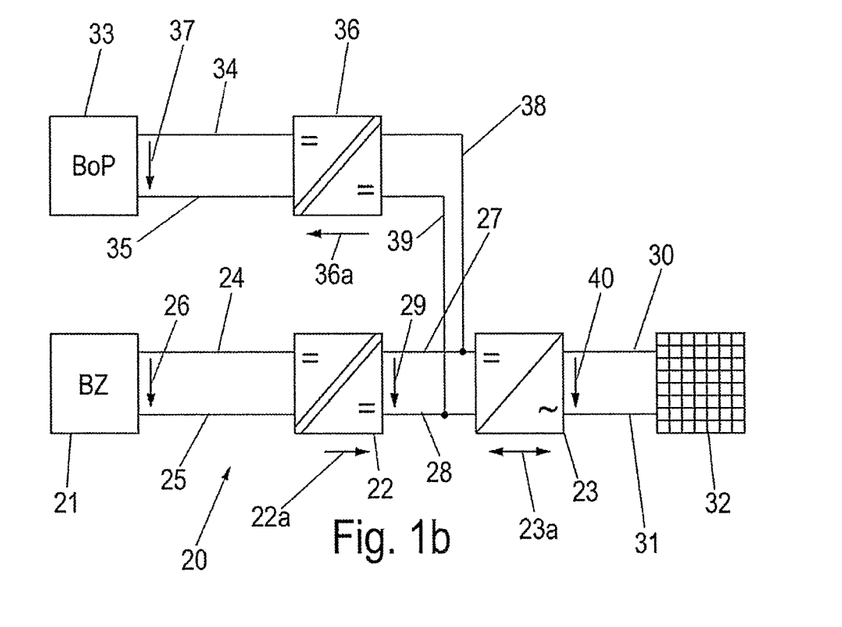
FIG. 1b shows a schematic illustration of a second embodiment of an apparatus according to the invention in the form of a block circuit diagram.

FIG. 1b shows a further embodiment of the invention. A further apparatus 20 according to the invention has an energy generator, for example a fuel cell 21, a DC-to-DC converter stage 22 (unidirectional, cf. arrow 22a) and a DC-to-AC converter stage 23 (bidirectional, cf. arrow 23a). The output terminals of the fuel cell 21 are connected to the terminals of the fuel cell side of the DC-to-DC converter stage 22 via electrical lines 24 and 25. A fuel cell voltage symbolized by the voltage arrow 26 is applied between the lines 24 and 25.

The intermediate circuit terminals of the DC-to-DC converter stage 22 with the at least one DC-to-DC converter device or with the plurality of DC-to-DC converter devices connected in parallel are connected to the intermediate circuit terminals of the DC-to-AC converter stage 23 via electrical lines 27 and 28. An intermediate circuit voltage symbolized by the voltage arrow 29 is applied between the lines 27 and 28.

The AC terminals of the DC-to-AC converter stage 23 are connected to a grid 32 (for example a 230 V, 50 Hz voltage supply grid) via electrical lines 30 and 31. A grid voltage symbolized by the voltage arrow 40 is applied between the lines 30 and 31.

Furthermore, the apparatus 20 has a system peripheral (BoP) illustrated as block 33, with this required for operating the fuel cell and requiring electrical energy. The system peripheral 33 of the fuel cell 21 is connected to the output terminal of the DC-to-DC converter stage 36 (unidirectionally, cf. arrow 36a) via electrical lines 34 and 35. A supply voltage symbolized by means of the voltage arrow 37 for the system peripheral 33 is applied between the lines 34 and 35.

The input terminals of the DC-to-DC converter stage 36 are connected to the intermediate circuit of the apparatus 20 via electrical lines 38 and 39 in accordance with one embodiment, but also independently of the variant under consideration. The voltage required for the supply to the fuel cell itself or to the system peripheral of the fuel cell is therefore tapped off at the intermediate circuit. The DC-to-DC converter stage 36 is in this case not used for supplying a battery as energy storage device. Instead, it makes it possible to provide the DC voltage suitable for supplying the system peripheral or the fuel cell in a simple manner. This DC voltage is often only a relatively low DC voltage of only 24 V, for example, with the result that it is advantageous to convert the DC voltage of the intermediate circuit correspondingly by the DC-to-DC converter stage 36 since the very high intermediate circuit voltage of for example 400 V cannot generally be used expediently for supply, with the result that the DC-to-DC converter stage 36, for example in the form of a step-down converter, is particularly advantageous. In addition, galvanic isolation with respect to the intermediate circuit can advantageously be realized at the same time with this DC-to-DC converter stage 36.

The converter stages 22 and 36 can be driven and embodied analogously to the converter stage 3 described in the first embodiment, and in this way step-up converters and/or step-down converters required so far in the apparatus 20 are no longer necessary either.

What is claimed is:

1. An apparatus for converting DC voltage from an electrochemical storage device or a fuel cell into an AC voltage for feeding into a power grid, comprising:
   a single DC-to-DC converter stage configured to generate an intermediate circuit voltage from an output voltage of the storage device or the fuel cell, wherein the single DC-to-DC converter stage is configured to convert a DC voltage in a wide input voltage range to the intermediate circuit voltage, with which a single DC-to-AC converter stage configured to generate the AC voltage can be operated, wherein the single DC-to-DC converter stage comprises two or more DC-to-DC converter devices connected together in parallel between the storage device or the fuel cell and the DC-to-AC converter stage, and
   a control device configured to drive the two or more DC-to-DC converter devices individually and differently from one another with control parameters that depend on an input voltage of the single DC-to-DC converter stage, wherein the control parameters comprise a clock frequency of a driving signal for driving switches of the DC-to-DC converter devices and a duty cycle of the driving signal,
   wherein the DC-to-AC converter stage is configured to generate the AC voltage from the intermediate circuit voltage.

2. The apparatus as claimed in claim 1, wherein the DC-to-DC converter device is configured to operate in a hard-switching or in a resonant-switching operating mode.

3. The apparatus as claimed in claim 1, wherein the two or more DC-to-DC converter devices connected together in parallel have a substantially identical design with respect to one or more of the following characteristic values: input voltage range, output voltage range, rated power, maximum clock frequency, minimum clock frequency, minimum duty cycle, maximum duty cycle.

4. The apparatus as claimed in claim 1, wherein the two or more DC-to-DC converter devices connected together in parallel have a different design with respect to one or more of the following characteristic values: input voltage range, output voltage range, rated power, maximum clock frequency, minimum clock frequency, minimum duty cycle, maximum duty cycle.

5. The apparatus as claimed in claim 1, wherein the DC-to-DC converter stage is configured to convert a DC voltage in a wide input voltage range of 1:2 to 1:3 directly to the intermediate circuit voltage.

6. The apparatus as claimed in claim 1, comprising a further DC-to-DC converter stage configured to generate a supply voltage for the fuel cell or a system peripheral via an intermediate circuit tap between the single DC-to-DC converter stage and the DC-to-AC converter stage.

7. A method for driving an apparatus for converting a DC voltage from a storage device or energy generator into an AC voltage for feeding into a power grid, the apparatus comprising a single DC-to-DC converter stage configured to generate an intermediate circuit voltage from an output voltage of the storage device or energy generator, wherein the single DC-to-DC converter stage is configured to convert a DC voltage in a wide input voltage range to the intermediate circuit voltage, with which a single DC-to-AC converter stage configured to generate the AC voltage can be operated, wherein the single DC-to-DC converter stage comprises two or more DC-to-DC converter devices connected together in parallel between the storage device and the DC-to-AC converter stage, and wherein the DC-to-AC converter stage is configured to generate the AC voltage from the intermediate circuit voltage, the method comprising:

driving the DC-to-DC converter devices by means of an input voltage dependent variation of at least one of the following control parameters: clock frequency and duty cycle; and driving the two or more DC-to-DC converter devices connected together in parallel in an individually different way with respect to the control parameters related to a driving signal for driving switches of the DC-to-DC converter devices.

8. The method as claimed in claim 7, wherein the two or more DC-to-DC converter devices of the converter stage are configured differently, the method comprising:

initially operating a first of the two DC-to-DC converters based on an input voltage of the converter stage in a first input voltage range, with the clock frequency of the first DC-to-DC converter device being increased as the input voltage increases within the first input voltage range until a point of a maximum clock frequency $f_{max}$, and deactivating the first DC-to-DC converter device based on the input voltage in a second input voltage range greater than the first input voltage range, and activating the second DC-to-DC converter device with the clock frequency of the second DC-to-DC converter device being increased further up to the maximum clock frequency.

9. The method as claimed in claim 7, wherein the two or more DC-to-DC converter devices are configured substantially identically, the method comprising:

activating the two DC-to-DC converter devices in a first input voltage range and driving the two DC-to-DC converter devices with an increasing clock frequency at an increasing input voltage within the first input voltage range, and deactivating a first of the two DC-to-DC converter devices when a maximum clock frequency $f_{max}$ is reached, while maintaining the second DC-to-DC converter device in operation and driving the second DC-to-DC converter device at a clock frequency that increases with the increasing input voltage within a second input voltage range that is greater than the first input voltage range until the maximum clock frequency is reached.

10. The method as claimed in claim 8, wherein as the input voltage increases from a first input voltage range to a second input voltage range, once the maximum clock frequency of the second DC-to-DC converter device has been reached, maintaining or reducing the clock frequency, and reducing the duty cycle of the second DC-to-DC converter device as the input voltage increases within the second input voltage range.

11. The method as claimed in claim 9, wherein as the input voltage increases from a first input voltage range to a second input voltage range, once the maximum clock frequency of the second DC-to-DC converter device has been reached, maintaining or reducing the clock frequency, and reducing the duty cycle of the second DC-to-DC converter device as the input voltage increases within the second input voltage range.

* * * * *